US011080724B1

(12) United States Patent
Arnott et al.

(10) Patent No.: US 11,080,724 B1
(45) Date of Patent: Aug. 3, 2021

(54) SYSTEMS AND METHODS FOR ANALYZING CONSUMER SPENDING USING GEOFENCING

(71) Applicant: MasterCard International Incorporated, Purchase, NY (US)

(72) Inventors: James J. Arnott, Ballwin, MO (US); Sai Sudha Venkata Chaganti, Ballwin, MO (US); Rick Unnerstall, O'Fallon, MO (US); John Young, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 347 days.

(21) Appl. No.: 15/616,082

(22) Filed: Jun. 7, 2017

(51) Int. Cl.
*G06Q 30/02* (2012.01)
*G06Q 20/34* (2012.01)
*H04W 4/021* (2018.01)

(52) U.S. Cl.
CPC ......... *G06Q 30/0201* (2013.01); *G06Q 20/34* (2013.01); *H04W 4/021* (2013.01)

(58) Field of Classification Search
None
See application file for complete search history.

(56) References Cited

U.S. PATENT DOCUMENTS

| 6,883,708 | B1 | 4/2005 | Fiedler et al. |
| 8,417,561 | B2 | 4/2013 | Ghosh et al. |
| 2010/0076813 | A1* | 3/2010 | Ghosh .............. G06Q 30/02 705/7.34 |
| 2011/0256881 | A1* | 10/2011 | Huang ............... G01S 5/0257 455/456.1 |
| 2012/0084117 | A1 | 4/2012 | Tavares et al. |
| 2012/0094639 | A1 | 4/2012 | Carlson et al. |
| 2013/0013471 | A1* | 1/2013 | Fishman .............. G06Q 40/00 705/31 |

(Continued)

OTHER PUBLICATIONS

Arthur Wolf, "The Unitended Consequences of Public Policy Choices: The Connecticut River Valley Economy as a Case Study", Nov. 2010, Northern Econmic Consulting, Inc. , The Vermont Economy Newsletter, p. 1-50 (Year: 2010).*

*Primary Examiner* — Patricia H Munson
*Assistant Examiner* — Chesiree A Walton
(74) *Attorney, Agent, or Firm* — Armstrong Teasdale LLP

(57) ABSTRACT

A geofence computing device, in communication with a user device and a payment processor, includes a memory and a processor in communication with the memory. The geofence computing device processor is configured to receive, from the user device, geofence data including a first user defined geofence zone having a first geographic area within a first geographic boundary, store the geofence data within the memory, receive, from the payment processor, from authorization request message transaction data representing a payment transaction initiated with a merchant by a cardholder associated with the payment processor, determine a geographic location of the merchant and a residence of the cardholder, compare the merchant geographic location and the cardholder residence geographic location to the first user defined geofence zone, and alert the user of the payment transaction based on the comparison. The transaction data includes at least one of a merchant location and a merchant identifier.

19 Claims, 7 Drawing Sheets

(56) References Cited

U.S. PATENT DOCUMENTS

| | | | |
|---|---|---|---|
| 2013/0191213 A1* | 7/2013 | Beck | G06Q 30/0267 |
| | | | 705/14.53 |
| 2013/0226539 A1 | 8/2013 | Shaw | |
| 2013/0226655 A1 | 8/2013 | Shaw | |
| 2013/0268340 A1 | 10/2013 | Colon et al. | |
| 2014/0279123 A1* | 9/2014 | Harkey | G06Q 50/10 |
| | | | 705/26.1 |
| 2015/0051953 A1 | 2/2015 | Howe | |
| 2015/0227934 A1 | 8/2015 | Chauhan | |
| 2015/0371248 A1 | 12/2015 | Ghosh | |
| 2016/0026779 A1* | 1/2016 | Grigg | G06F 21/31 |
| | | | 726/4 |
| 2016/0125400 A1* | 5/2016 | Hu | G06Q 20/3224 |
| | | | 705/44 |
| 2016/0169696 A1* | 6/2016 | Butts, III | G01C 21/3461 |
| | | | 701/438 |
| 2016/0328728 A1 | 11/2016 | Khvostov et al. | |
| 2017/0061455 A1 | 3/2017 | Pastore et al. | |
| 2017/0084150 A1* | 3/2017 | Keyton | G08B 21/0261 |
| 2017/0270505 A1* | 9/2017 | Tsou | G06Q 20/0453 |
| 2018/0060838 A1* | 3/2018 | Agrawal | G06Q 20/20 |
| 2018/0349411 A1* | 12/2018 | Hui | H04W 4/021 |

\* cited by examiner

SYSTEMS AND METHODS FOR ANALYZING CONSUMER SPENDING USING GEOFENCING

BACKGROUND OF THE DISCLOSURE

This disclosure relates generally to geofencing and, more specifically, to systems and methods for analyzing consumer spending using geofencing.

Transactions using a payment card, such as a credit card, can be tracked by merchants and/or location. Businesses, for example, are able to track spending patterns according to different locations. Similarly, local governments are able to track business revenue within their own region and/or jurisdictions. However, both businesses and local governments have difficulty determining how their individual customers and citizens, respectively, spend money, and more particularly, how far away from a residential address the particular customer/citizen is willing to spend money for particular goods and services. Such information may be estimated or extrapolated based on the results of polls or surveys of individual customers and/or merchants, but these results can be inaccurate.

Without accurate spend information, it is difficult for businesses, for example, to determine where to optimally place a retail location to capitalize on spending trends. Local governments/municipalities similarly have difficulty determining how relative tax rates between their jurisdiction and other jurisdictions affect spending by their citizenry, and what factors are optimal to attract various businesses to open a retail location within their jurisdiction.

BRIEF DESCRIPTION OF THE DISCLOSURE

In an embodiment, a geofence computing device for monitoring and analyzing payment card transactions within geofence zones is provided. The geofence computing device is in communication with a user device and a payment processor, and includes a memory and a processor in communication with the memory. The processor is configured to receive, from the user device, geofence data including a first user defined geofence zone having a first geographic area within a first geographic boundary, store the geofence data within the memory, and receive, from the payment processor, transaction data included within an authorization request message. The transaction data represents at least one payment transaction of the payment card transactions, initiated with a merchant by a cardholder associated with the payment processor. The transaction data includes at least one of a merchant location and a merchant identifier. The processor is further configured to determine a geographic location of a residence of the cardholder, determine a geographic location of the merchant, compare the merchant geographic location and the cardholder residence geographic location to the first user defined geofence zone, and alert the user of the payment transaction based on the comparison.

In an embodiment, a computer-implemented method for creating and analyzing geofence zones is provided. The method is implemented using a geofence computing device including a processor in communication with a memory, a user device, and a payment processor. The method includes the steps of receiving a first zone perimeter input information from the user device, generating a first geofence zone based on the received first zone perimeter input information, receiving payment card identification information for one or more payment cards assigned to cardholders having a residence within the first geofence zone, receiving transaction data relating to one or more payment transactions performed using the one or more payment cards, determining location data for one or more of a cardholder and a merchant involved in the one or more payment transaction, cross referencing the received transaction data with one or more of merchant data relating to the merchant and demographic data relating to the cardholder, and transmitting an alert to the user device based on the step of cross referencing.

In another embodiment, a non-transitory computer-readable storage medium has computer-executable instructions embodied thereon. When executed by a geofence computing device including a processor in communication with a memory, a user device, and a payment processor, the computer-executable instructions cause the geofence computing device to receive, from the user device, geofence data including a first user defined geofence zone having a first geographic area within a first geographic boundary, store the geofence data within the memory, and receive, from the payment processor, transaction data included within an authorization request message. The transaction data represents a payment transaction initiated with a merchant by a cardholder associated with the payment processor, and includes at least one of a merchant location and a merchant identifier. The instructions further cause the geofence computing device to determine a geographic location of a residence of the cardholder, determine a geographic location of the merchant, compare the merchant geographic location and the cardholder residence geographic location to the first user defined geofence zone, and alert the user of the payment transaction based on the comparison.

BRIEF DESCRIPTION OF THE DRAWINGS

FIG. 1 is a simplified block diagram of a geofence creation and monitoring system that includes a geofence computing device for creating and monitoring transactions initiated within geofence zones.

FIG. 2 illustrates an example configuration of a user system operated by a user shown in FIG. 1.

FIG. 3 illustrates an example configuration of a server system such as the geofence computing device shown in FIG. 1.

FIG. 4 is an example map of zones created by the geofence computing device shown in FIG. 1, and displayed in a website and/or a computer application.

FIG. 5 is an example method for creating and monitoring transactions initiated within a geofence zone using the geofence computing device shown in FIG. 1.

FIG. 6 shows an example configuration of a database within a computing device, along with other related computing components, that may be used to create, organize, and monitor zones created using the geofence computing device shown in FIG. 1.

FIG. 7 shows an example graphical user interface (GUI) of a user device, such as the client system shown in FIG. 2, operated by a user to create, organize, and monitor zones.

DETAILED DESCRIPTION OF THE DISCLOSURE

Figure 1:
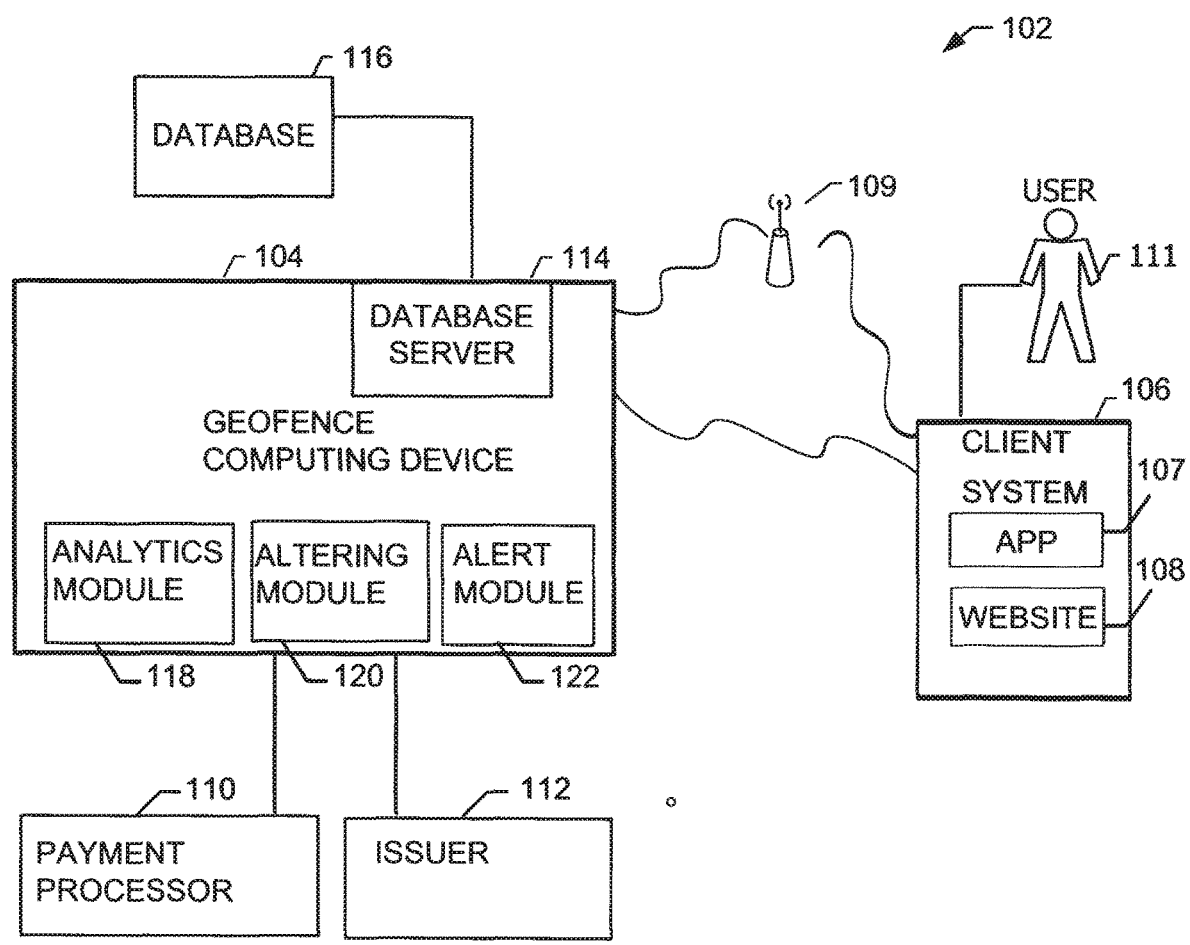
FIGS. 1-7 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems utilizing geofences to accurately determine spending trends based on anonymized customer transaction data, anonymized purchaser demographic data, geographic data, and/or other parameters. Systems and methods according to the disclosure herein thus provide significantly more accuracy into determining actual, as well as predictive, consumer spending within particular geozones.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, a "processor" may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term processor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, a computer program is provided, and the program is embodied on a computer readable medium. In an exemplary embodiment, the program is executed on a single computer system, without requiring a connection to a sever computer. In at least one embodiment, the program is run in a Windows® environment (Windows is a registered trademark of Microsoft Corporation, Redmond, Wash.). In another embodiment, the program is run on a mainframe environment and a UNIX® server environment (UNIX is a registered trademark of X/Open Company Limited located in Reading, Berkshire, United Kingdom). In these examples, the program is flexible and designed to run in various different environments without compromising any major functionality. In some embodiments, a system includes multiple components distributed among a plurality of computing devices. One or more components may be in the form of computer-executable instructions embodied in a computer-readable medium. The systems, processes, and programs are not limited to the specific embodiments described herein. In some embodiments, system or process components can be practiced independently and separately from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, wearables, smartphones, personal digital assistants (PDAs), key fobs, and/or any other computing devices capable of storing and providing account data. Each type of transaction card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "geofence" (or "geo-fence") refers to a virtual geographic boundary, defined by Global Positioning System (GPS) satellite network and/or local radio-frequency identifiers (such as RFID, Wi-Fi nodes, Bluetooth beacons, etc.), around a particular location. Geofencing enables software to trigger a response when an electronic device (e.g., a mobile phone, tablet, payment card with an RFID chip, etc.) enters or leaves a particular area defined by the geofence. The geofence thus defines a virtual perimeter for a real-world geographic area. A geofence may be dynamically generated (e.g., a radius around a store or static/mobile point location) or predetermined (e.g., school zones, ZIP Codes, or neighborhood boundaries). The geofence is paired with a hardware and/or software application that responds to the geofence boundary as dictated by the parameters of the application.

The systems and methods described herein enable users (e.g., cardholders) to create and organize geofence zones for one or more payment cards using a geofence computing device. The systems and methods described herein further enable entities such as payment processing systems to analyze cardholder transaction data within different geofence zones, and also make predictive determinations regarding the effects of a change in geofence financial parameters on future cardholder activity within different geofence zones.

In an example embodiment, the geo-fence computing device utilizes a location-aware device (e.g., GPS) of a location-based service (LBS) user entering or exiting the geofence. Such crossing of the virtual boundary will trigger an alert to the user of the location-aware device. In some embodiments, crossing the virtual geo-fence boundary will result in a message to the geo-fence operator. These alerts and messages may be transmitted, for example, to an email account or a mobile telephone (text or email).

In the example embodiment, the geofence computing device generates geofence zones and applies the generated zones to purchases made using one or more payment cards of a payment card network. In some embodiments, the geo-fence computing device integrates with the payment card network to create multiple geo-fence zones, such as an all-spend geofence zone, a target-spend geofence zone, and/or a no-spend geofence zone, in addition to other types of geo-fence zones that can be created. The geofence computing device includes a memory device and a processor in communication with a payment network. The geofence computing device is configured to receive transaction information for a plurality of cardholders from the payment network. As further described below, the geofence computing device includes an analytics module for analyzing transaction data of a cardholder to make merchant recommendations and/or zone recommendations, a zone altering module for altering a geofence zone based on transaction data and/or cardholder input, and an alert module for transmitting an alert to a cardholder and/or an issuer. A cardholder, using the geofence computing device, creates and/or organizes geofence zones (hereafter referred to as "zones")

to manage transaction authorizations as the cardholder travels in order to prevent fraud. The geofence computing device further uses actual transaction data to modify or create zones that more accurately reflect the actual spend patterns for the cardholders.

In the example embodiment, an issuer and/or the geofence computing device provides a customized website accessible using a web browser and/or a software application that can be downloaded and installed on a computing device, referred to as a "service app." The customized website and/or the service app provide certain features, functions, and/or services to the cardholder for creating and organizing zones, as described herein.

In one embodiment, a cardholder uses the customized website or the service application in communication with the geofence computing device to create one or more zones for one or more payment cards. The geofence computing device receives geofence data from the customized website or the service application. In some embodiments, the geofence computing device is configured to receive from the cardholder user or payment system user a location, such as a zip code, and a zone radius (i.e., 50 miles), etc. In one example, the geofence computing device is configured to designate a center point of the location (e.g., a central point within a zip code) and apply the zone radius from the center point. In an alternative example, the user specifies a zone to the geofence computing device by designating a particular location, such as by entering an address or coordinates, and indicating a zone radius from the specified point. In another example, the user can specify the zone boundary by using an input device to draw a zone perimeter on a map displayed in the customized website and/or the service app (e.g., FIG. 7). In still other examples, the geofence computing device is configured to receive city, state, county, and/or municipality information entered by the cardholder.

In an alternative embodiment, a user, such as a government entity, a business entity, or third party analyst, utilizes the website/service application in communication with the geofence computing device to create one or more zones for transactions performed by one or more payment cards. In some embodiments, the geofence computing device is configured to receive from the user the location and a zone radius (i.e., 50 miles), or boundary, as described below. In one example, the geofence computing device is configured to designate a center point of the location (e.g., a central point within a zip code) and apply the zone radius from the center point. Similar to the embodiment described above, the user may specify a zone (or zones) to the geofence computing device by designating the location/zone radius, the zone boundary a zone perimeter on a map, and/or city, state, county, zip code, and/or municipality information selected by the user.

The geofence computing device is configured to create the zone (also referred to as a "user defined geofence zone") based on one of the processes described above (i.e., a location and a zone radius, a zone perimeter drawn on a map, city, state, and/or municipality lines, etc., received by the geofence computing device). The geofence computing device then stores the geofence zone into a memory. In an example embodiment, the geofence computing device is configured to receive from a cardholder or payment processor user one or more account identifiers, such as a payment account number (PAN) of a payment card or cards, which apply to the geofence zone (e.g., a cardholder address within the geofence zone, or a cardholder transaction performed within the geofence zone). In another embodiment, the geofence computing device is configured to receive a digital wallet (including one or more PANs) to apply to the zone. The user may create as many zones as desired using such procedures. As described above, a zone is a virtual boundary that surrounds a geographic area. The zone can be substantially circular or polygonal or any other shape. A zone can also include multiple areas that are not contiguous, or can include multiple areas that are connected along roads of travel.

In all of the embodiments described herein, the geofence computing device is implemented only where privacy and or data usage laws permit the use thereof, including collection of data from customers or cardholders (e.g., account identifiers, PANs, digital wallets, etc.). In some embodiments, where permitted, cardholders/customers are provided the ability to opt-in to allow some or all of their personal data to be collected by the geofence computing device for the services provided thereby. In at least one embodiment, cardholders are offered incentives and/or rewards for opting into the services. In an alternative embodiment, the geofence computing device is configured to receive anonymized and/or aggregated data from the payment processor. In all instances, the geofence computing device is implemented in compliance with all relevant local, state, federal, and international laws.

As described below, the geofence zones are linked to transaction rules that are stored in memory. Thus, users can be notified when a zone is "violated" (e.g., such as when a transaction occurs outside the zone for a mobile device crosses the virtual boundary of the zone). In some embodiments, notification of geofence violations in this manner can serve to limit or prevent theft and fraud, such as by promptly alerting an issuer that a transaction may be fraudulent. In other embodiments, geo-fence violation notifications (e.g. alerts, messages, etc.) serve to provide valuable accurate anonymized customer transaction and demographic spending information, which can be further analyzed to estimate the benefits or consequences of changing merchant- or government-controlled parameters, such as retail locations, local tax rates, etc.

Where the user is a cardholder or payment processor, the geofence computing device is further configured to receive a zone type for each zone (also referred to as a user defined geofence rule associated with the zone). Zone types include, but are not limited to, (i) a no-spend zone in which the geofence computing device triggers an alert or declines a transaction authorization request if the transaction occurs within the no-spend zone or if the transaction is initiated with a specific type of merchant (e.g., no spend on alcoholic beverages); (ii) an all-spend zone in which the geofence computing device allows unlimited spending within the all-spend zone and triggers an alert or declines a transaction authorization request if the transaction occurs outside the all-spend zone, and (iii) a target-spend zone in which the geofence computing device only allows transactions at specific merchants or within specific merchant categories (e.g., transactions including gasoline purchases) within the target-spend zone and triggers an alert or declines a transaction authorization request if the transaction originates with an unspecified merchant within the target-spend zone.

In an example embodiment, where the geofence zone is designated by the payment processing network system, data collected from payment card transactions within the several zone types is stored within a memory. Zone violation alerts/messages may also be stored in the memory, or a separate database. The geofence computing device is configured to allow a user to bundle two or more zones together to manage zones as a group to more efficiently mirror the travel patterns of a cardholder of the payment processing network. For the payment processing network user, such bundling allows the user to aggregate and analyze large quantities anonymized cardholder transaction data for analysis by the geofence computing device. If, on the other hand, the geo-fence zone is designated by a cardholder user, the payment processor user may create several zones and limit a payment card to those zones, or alert the cardholder to particular incentives offered within particular zones. Zones may be affected by other parameters, such as time rules (also referred to as zone time constraints) incorporated with respect to one or more zones. For example, one zone may be designated as a "no-spend zone" from Monday to Thursday, but as a "target spend zone" from Friday to Monday.

In one embodiment, the payment processor receives payment transactions for processing made by cardholders at merchants. The payment processor stores data associated with these payment transactions in a database. The geofence computing device, in communication with the payment processor and/or the payment network database, receives the transaction data in real-time. The transaction data includes at least data associated with the cardholder (e.g., an account identifier such as a payment card number of the payment card used to conduct the payment transaction, or a PAN), the merchant (e.g., a merchant identifier provided during the transaction) involved in the transaction, a merchant category that identifies a type of merchant, a geographic location of the merchant, and a date and a time for the transaction. The transaction data may further include, without limitation, authorization request messages regarding the payment transaction, debits from the payment card involved in the purchase, transaction clearing messages, and other information identifying the merchant. In some examples of this embodiment, the user of the geofence computing device may be a third party entity, and not directly in communication with the payment processor.

In the example embodiment, when the geofence computing device receives transaction data from the payment processor, the geofence computing device searches the memory for an account identifier (e.g., a PAN) associated with one or more zones that matches the account identifier used in the transaction. The geofence computing device retrieves the one or more zones associated with the account identifier used in the transaction. The geofence computing device then determines, using the geographic location of the merchant provided in the transaction data, whether the cardholder initializing the transaction is inside or outside the one or more zones. The system is configured to determine the location of the merchant based upon the transaction data, wherein the transaction data includes an actual address of the merchant, a geolocation of the merchant, or a name of the merchant that can be looked-up to retrieve the address. The system then uses this address as the address where the cardholder is located, and compares the address to the geofence zones stored in the memory for the cardholder.

In an alternative embodiment, the geofence computing device determines whether a cardholder is inside or outside a zone by receiving a location determination of a cardholder's wireless device (e.g., smartphones, tablets, wearables, and other mobile computing devices). The geofence computing device compares the location determination to one or more zones associated with the cardholder, and stored in memory. The location determination may be determined based on wireless data and/or other geolocation data (alternately referred to herein as "geographic location data") such as electronic device location data, geotemporal data, or geopositioning data, as defined below. For example, a primary account number (PAN) of the cardholder may be paired with the cardholder's smartphone (e.g., via a unique device ID). This pairing of a wireless device ID to a PAN may be achieved by, for example, a cardholder registering their wireless device ID to the PAN assigned to the cardholder. In another embodiment, through identification of the cardholder, the mobile device of the cardholder is also identified, namely in the case where the cardholder has registered the mobile device with the card number and/or in the case where the geofence computing device has automatically linked the mobile device to the PAN.

As used herein, the term "geolocation" refers to a user's location as collected from a cell phone tower or beacon, GPS, or other position indicators, and can include GPS coordinates, street address, an IP address, geo-stamps on digital photographs, smartphone check-in or other data, and other location data provided as a result, for example, of a telecommunications or online activity of a user. "Geotemporal" data is temporal and geolocation data (cell phone tower location, IP address, GPS coordinates) that is sent, usually along with other information, from a communications device a user is accessing (such as, a cell phone tower, computer, GPS device, or other mobile device) to perform a certain activity at a particular time. "Geopositioning" data, as used herein, refers to at least one of geolocation and geotemporal data, and can include, for example, the particular location of a mobile device user, the date and time the mobile device user was at that particular location and the duration of the stay at that location. The geopositioning network can include, for example, cellular towers, cellular networks, global positioning system (GPS) providers, GPS networks, mobile device networks, client application (e.g., "app") providers, client application systems, and/or other networks where geopositioning data is collected and/or stored from mobile devices and/or mobile device users.

In the example embodiment, the geofence computing device adds a flag to the authorization request message indicating whether the transaction satisfies or violates a geofence rule. More particularly, when the geofence computing device receives payment transaction data from the payment network and determines that the cardholder, for example, is outside, inside, or crossed the boundary of a zone, and also initiated a transaction with a particular merchant or triggered a time rule, the geofence computing device is configured to flag the transaction (e.g., through an authorization request message, such as an ISO 8583 authorization message, to approve the transaction) that is pending to the issuer. In some embodiments, the flag can be triggered when a particular parameter, such as local sales tax, is different within the transaction zone in comparison to another zone, such as the cardholder's zone of residence.

In some embodiments, the geofence computing device is able to access the cardholder's address from a memory and/or database. In other embodiments, the geofence computing device does not store the cardholder's residential address, but instead utilizes a model to predict the residence address. In an exemplary embodiment, transactions flagged by geofence computing device are utilized in a predictive model to estimate changes in spending trends according to potential changes in one or more of the monitored parameters. For example, the geofence computing device may predict the change in spending trends within a particular zone, or a number of zones, according to a projected increase the sales tax applied to the particular zone. This predictive information thereby provides significantly more accuracy to government entities in their decisions regarding how to set local tax rates, and/or to business entities in their decisions regarding where to optimally create retail locations.

More specifically, transaction data generated by the geofence computing device advantageously assists governments/local municipalities to understand, for example, the impact of lost sales from competing merchants in nearby towns and municipalities (e.g., nearby zones) due to different tax rates or other parameters, such as business ordinances specifying hours of operation, zoning codes, etc. A government entity, such as a municipality, may further utilize this generated transaction data to better understand merchant gaps within the municipality's city limits, or zone.

Further to the municipality example, the geofence computing device is configured to first utilize geo data to both determine or verify which cardholders of a payment processing network reside within the municipality, and also establish a geofence for the municipality. In this example, the geofence computing device may be configured to analyze transaction data from the verified cardholder residents within its zone to better understand where the cardholders are performing merchant transactions, that is, inside or outside of the particular municipality zone defined by the geofence computing device. The geofence computing device then may further analyze merchant data, such as products and price points, within and outside of the defined municipality zone and cross reference the merchant data with the transaction data. Once these two types of data are analyzed and cross referenced, the geofence computing device may be still further configured to calculate whether there are one or more particular merchants within the municipality zone at a disadvantage or advantage with respect to a monitored parameter. For example, the geofence computing device may calculate a determination that Merchant A benefits from, or is penalized by, the sales tax within the municipality zone, as compared with similar merchants outside of the zone.

In one exemplary embodiment, the geofence computing device is further configured to determine whether specific merchant products available within the municipality zone are being purchased outside of the zone. In some embodiments, the geofence computing device may determine whether products being purchased outside of the zone are being purchased by cardholders within the zone. In other embodiments, the geofence computing device is configured to utilize the generated transaction data to determine whether merchant products being purchased outside of the zone are available within the zone. In further embodiments, the geofence computing device is configured to calculate a score regarding the estimated success of providing particular products and services within the zone that are presently being purchased outside of the zone. These functional capabilities of the geofence computing device are not necessarily exclusive to one another, and one or more of such functional capabilities can be used in combination with the other capabilities.

In a practical application of geofence computing device, the geofence computing device is utilized, for example, to determine the impact of a first municipality's sales tax on the purchase of new appliances. In this example, the first municipality has a local sales tax of 7.95%, and a second municipality has a local sales tax of 8.45%. The geofence computing device is configured in this example to determine, from cardholder transaction data, how many cardholder residents who live in each municipality bought a particular appliance (e.g., a refrigerator) within a specified time period, such as a calendar year. The geofence computing device utilizes the transaction data to further determine where the residents bought the particular appliance, and then calculates the financial impact to the first and second municipalities, and/or merchants located therein, from the cumulative appliance purchases over time. In one embodiment, the geofence computing device is further configured to calculate the probability that residents of the second municipality travel to the first municipality to take advantage of the lower sales tax rate for the purchase of high-cost products, such as appliances.

In another practical example, the geofence computing device is utilized to determine the spending trends for relatively low-cost items, such as cigarettes, gasoline, liquor, etc., which are typically purchased with more frequency, and then estimate the impact of a parameter change of a first municipality with respect to a second municipality. For example, the cigarette tax in Illinois is presently about $1.98 per pack, whereas the per-pack tax in Missouri, which borders Illinois, is about $0.17. Utilizing the geofence computing device, a first municipality on one side of the border may evaluate the spending trend of cardholders on the other side of the border (e.g., a second municipality) crossing the border to purchase cigarettes. In some embodiments, the geofence computing device further implements a predictive unit to estimate the impact on such cross-border purchases, if for example, the Illinois per-pack tax was reduced, or if the Missouri per-pack tax was increased. Multiple zones may be created to calculate spending trends for different zones at increasing distances from the border, and/or for zones that may have different tax rates within different municipalities of the same state. In this example, the specified time period may be shorter, such as a calendar month, where cardholders may tend to stock up on the purchased product.

Similar tracking and estimating may be performed where the product is, for example, gasoline. Particular parameters, such as sales taxes, may be tracked at the municipality, county, and/or state level, and the specified time period may be daily or weekly, as the cost of the product is subject to change on more regular basis. Where the product is, for example, liquor, the geofence computing device may alternatively or additionally configured to evaluate spending trends between first and second zones regarding parameters such as business hours of operation. Zoning laws within the first zone, for example, may require a liquor merchant in the first zone to confine its hours of operation such that it closes earlier than a similar liquor merchant in the second zone. The geofence computing device may be configured in such instances to evaluate cardholder spending trends between the competing merchants, and predict an impact on the respective spending trends if, for example, the zoning laws in the first zone were changed to increase the hours of operation of competing businesses.

In some embodiments, separate from or in combination with the embodiments described above, a user can utilize a customized website and/or service application in communication with the geofence computing device to view a map of one or more created zones, as shown in FIG. 8. The geofence computing device uses the zone data saved in the memory to display the one or more zones on the map. In some of these embodiments, different zone types are shaded different colors for easy identification. In additional embodiments, the user specifies a zone (i.e., a geofence boundary) by using an input device to draw a zone perimeter on the map displayed in the customized website and/or the service app, as described above.

In some embodiments, the geofence computing device is configured to apply time rules to monitor one or more zones for a predefined duration (e.g., one month) and/or during predefined hours (e.g., from 9 p.m. to 7 a.m.). As a result, the geofence computing device is configured to "turn a zone on and off" based on predefined parameters (e.g., dates and times). That is, the zone boundaries may be dynamic according to user-defined zone parameters. Additionally, different zones can have different time rules. The user-defined zone parameters may be entered into the customized website or the service application. For example, when creating a zone, the user may enter a range of dates for a zone to be active. In addition, one or more time rules can be incorporated with one or more zones types for a zone. For example, a zone may be a no spend zone from Monday to Thursday, but may be a target spend zone from Friday to Monday. In the municipality example, described above, transaction data gathered after typical business hours may not be deemed of significant value. Alternatively, a municipality may wish to utilize such information to determine whether to allow particular merchants to expand their hours of operation (e.g., the liquor merchant example, above).

In one embodiment, the geofence computing device is configured to monitor a location of a cardholder based on a wireless signal associated with the cardholder and to transmit one or more alerts to a cardholder and/or an issuer in the event that the cardholder travels inside or outside a zone and/or transaction activity occurs inside or outside a zone. For example, an alert may be sent to the cardholder when the geofence computing device detects that the cardholder enters or leaves a particular zone. Some merchants, for example, may wish to offer purchase incentives (e.g., coupons etc.) to local residents within the same zone. The alert may be transmitted as a SMS text (i.e., a text message) to a mobile phone of the cardholder. The alert may include, but is not limited to, information identifying a zone that the user is entering or leaving. In other embodiments, the message may be transmitted using other communication formats, including email messages, SMS messages, and/or any other communication format.

In one embodiment, the geofence computing device is configured to analyze actual transaction data, including transaction data of one or more cardholders, in relation to zones previously created by the cardholder(s) to identify merchants that may be of interest to the cardholder(s). Based on the analysis, the geofence computing device may be configured to additionally transmit merchant recommendations to the cardholder. For example, a cardholder frequently shops at a specialty merchant located outside an all-spend zone created by the cardholder. The geofence computing device determines, based on other transaction data (e.g., other cardholders), that the specialty merchant has now opened a new location that is within the all-spend zone. The geofence computing device is configured to transmit a notification (i.e., an email, a SMS message, etc.) to the cardholder regarding the new store location. The device may also show all such specialty merchants, whether inside or outside the cardholder's zone, so that the cardholder can approve the merchant as an all-spend merchant (i.e., a target-spend zone merchant), such that the merchant, irrespective of the merchant's location, is saved in a memory as a merchant where the cardholder has approved transactions. In an alternative example, the geofence computing device specialty store is in a second zone outside of a first zone where the cardholder resides, and the alert is sent to the cardholder when the new specialty store opens within the first zone.

In another embodiment, the geofence computing device is configured to periodically analyze transaction data of a cardholder to analyze the transaction data relative to a zone (i.e., identify transactions made near a zone, outside a zone, in a competing zone, or far from a zone). In this embodiment, the geofence computing device may be further configured to update its predictive determinations regarding a particular zone when a cardholder makes frequent transactions close to, but outside, a radius boundary of the monitored zone. In some embodiments, the geofence computing device is configured to monitor whether cardholders perform multiple transactions with preferred merchants or retail locations within or outside of a zone. In one example, such monitoring includes transactions performed with online retailers. In these examples, the geofence computing device may be further configured to create "mini-zones" around preferred merchants and retail locations, and further utilize transaction data and/or merchant data from these mini-zones to update the predictive calculations regarding spending trend effects on a zone from these mini-zones within or outside of the zone.

A technical effect of the systems and processes described herein include at least one of: (a) improved accuracy of location tracking of cardholders using GPS sensors and/or transaction data, (b) location alerts tailored to specific users to optimize the frequency of generating location alerts, reducing data storage and processing (e.g., bandwidth) requirements required for unnecessary alerts, and (c) improving the accuracy of predictive calculations for local government policies (e.g., sales tax rates, retail operation hours, retail zoning limitations, etc.), businesses establishing optimal retail locations, or third party analysts generating spending trend reports and predictive estimates.

The following detailed description illustrates embodiments of the disclosure by way of example and not by way of limitation. It is contemplated that the disclosure has general application to processing financial transaction data by a third party in industrial, commercial, and residential applications.

FIG. 1 is a simplified block diagram of a geofence creation and monitoring system 102 that includes a geofence computing device 104 for creating and monitoring geofence zones. System 102 includes geofence computing device 104 in communication with a plurality of client systems 106 (only one client system 106 shown in FIG. 1). In the example embodiment, client system 106 is a mobile device, such as a mobile device capable of interconnecting to the Internet including a web-based phone, also referred to as a smart phone, a personal digital assistant (PDA), a tablet, or other web-based connectable equipment. In an alternative embodiment, client system 106 is a server, a desktop computer, or a laptop computer. Client system 106 is associated with, and utilized by a user 111. User 111 may represent a government entity, the business entity, or in some cases, a cardholder associated with the payment processor 110. Client system 106 may be interconnected to the Internet through a variety of interfaces including, without limitation, a network, such as a local area network (LAN) or a wide area network (WAN), dial-in connections, cable modems and special high-speed ISDN lines. In some embodiments, client system 106 includes a software application 107 (i.e., a service application) installed on client system 106. In additional embodiments, client system 106 includes a customized website 108 accessible by a web browser installed on client system 106, and viewable on a display (not shown in FIG. 1) thereof.

In further embodiments, client system 106 is in communication with a geopositioning network 109 to facilitate GPS functionality of client system 106. As described above, geofence computing device 104 receives and collects geopositioning data from client system 106. In the example embodiment, geofence computing device 104 is in communication with payment processor 110 and/or issuer 112. Payment processor 110 and/or geofence computing device 104 may be associated with an interchange network (not shown). Geofence computing device 104 is configured to collect transaction data from payment processor 110. In some embodiments, geofence computing device 104 is further configured to merchant data from payment processor 110.

A database server 114 is connected to database 116, which contains information on a variety of matters, as described below in greater detail. In one embodiment, centralized database 116 is disposed within geofence computing device 104. In an alternative embodiment, database 116 is disposed remotely from geofence computing device 104 and may be non-centralized. In the example embodiment, database 116 stores the transaction data conducted over payment processor 110, including data relating to merchants, merchant locations, and cardholders. In some embodiments, database 116 also stores cardholder data relating to zone creation and organization, and/or merchant data. In particular, database 116 stores zones created user 111. In some embodiments, database 116 stores data necessary to host the customized website and/or the service application accessible by user 111 for zone creation and organization.

In the example embodiment, geofence computing device 104 is configured to receive transaction data and/or merchant data from payment processor 110. In another embodiment, geofence computing device 104 is further configured to receive geopositioning data from geopositioning network 109. Geopositioning network 109 may be a component in a larger geopositioning network. Geofence computing device 104 is configured to determine whether a cardholder is inside or outside of a zone based on one or both of the received transaction data and/or the geopositioning data, as described above.

Geofence computing device 104 further includes an analytics module 118, a zone altering module 120, and an alert module 122. Analytics module 118 analyzes transaction data from cardholder uses and calculates spending trends from the analyzed transaction data. For example, analytics module 118 may identify one or more merchants frequently visited by a cardholder outside a home zone, e.g., the zone where the cardholder resides, and cross reference the transaction data therefrom with the merchant data from the one or more merchants. In at least one embodiment, analytics module 118 is further configured to collect, analyze, and cross reference demographic data of one or more cardholders, including the cardholder age, gender, marital status, income level, number of children, etc. In some embodiments, analytics module 118 further calculates predictive estimates from the cross referenced data regarding changes in zone parameters (e.g., changes in sales tax rates, retail operation hours, location from zone boundary, purchase price of particular goods or services, etc.) input by user 111. In some embodiments, analytics module 118 also calculates spending trend differences between zones based on one or more zone parameters. Zone altering module 120 alters zones based on transaction data or user input. For example, zone altering module 120 may alter an existing zone or create a new zone based on data received from a user device (i.e., the customized website or the service application), or may automatically alter the zone based on the transaction data or predetermined parameters without further user input.

Alert module 122 is configured to transmit an alert or a message to a user, as described above. For example, in one embodiment, alert module 122 transmits a recommendation to user 111 regarding cardholder spending trends within a zone. In another embodiment, alert module 122 transmits an alert to user 111 regarding a purchase transaction in one zone by a cardholder residing a different zone. In some embodiments, alert module 122 transmits the alert to user 111 regarding zone activity only within particular operating hours, and/or regarding transactions for goods or services above or below the predetermined threshold amount. In one embodiment, alert module 122 transmits an alert to payment processor 110 or user 111 that a cardholder located within a particular geofence zone is performing a payment card transaction with a merchant outside of the particular zone. Alternatively, alert module 122 transmits the alert to payment processor 110 or user 111 for payment card transactions performed within the particular zone. In another embodiment, alert module 122 transmits a calculated score, from analytics module 118, to user 111 regarding the predicted change in spending trends in the event of a change in zone parameters.

Although only one issuer 112, one payment processor 110, one user 111, and one client system 106 are illustrated, it should be understood that system 102 may include any number of issuers 112, users 111, payment processors 110, and/or client systems 106 in communication with geofence computing device 104.

Figure 2:
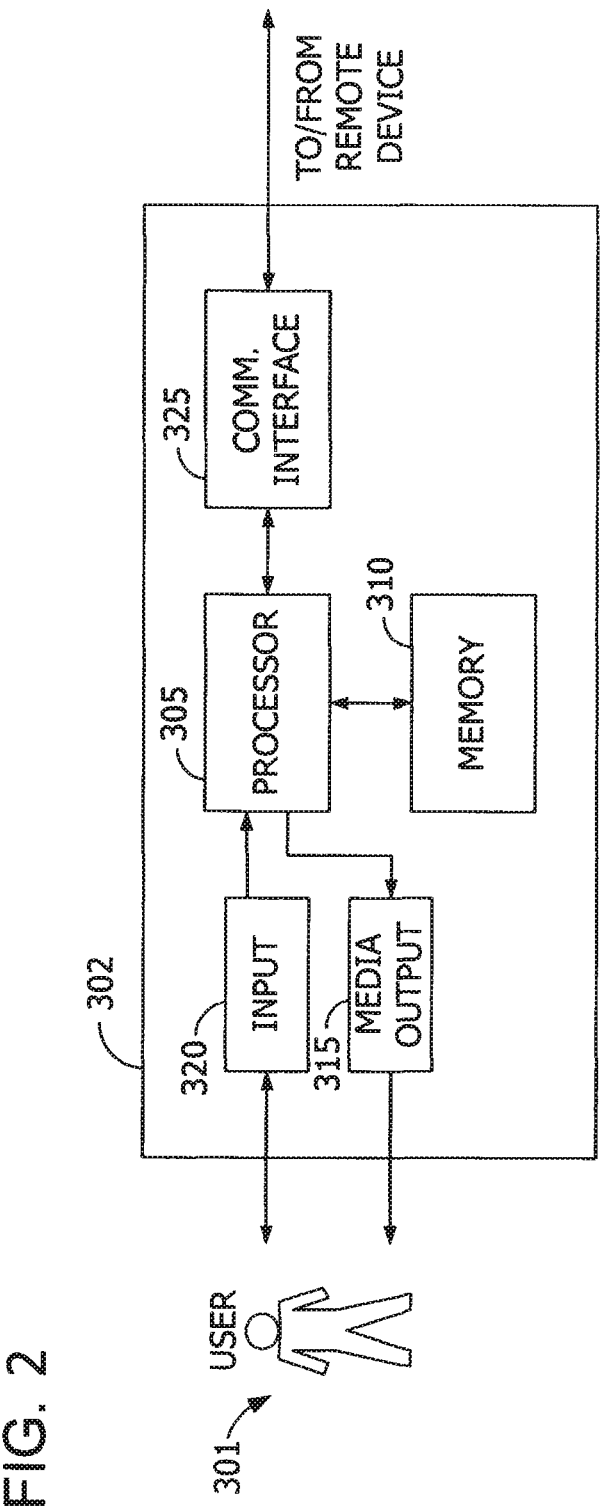

FIG. 2 illustrates an example configuration of a user system 302 operated by a user 301. User system 302 may include, but is not limited to, client systems 106 (including mobile computing devices, servers, and/or desktop computers). In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

In the example embodiment, user system 302 further includes at least one media output component 315 for presenting information to user 301. Media output component 315 may be, for example, any component capable of conveying information to user 301. In some embodiments, media output component 315 includes an output adapter such as a video adapter and/or an audio adapter. An output adapter is operatively coupled to processor 305 and operatively coupleable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively coupleable to a remote device such as payment processor 110 and/or geofence computing device 104. Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website. A client application allows user 301 to interact with a server application from a server system.

In some embodiments, user system 302 includes a GPS sensor (not shown) integral with communication interface 325 and/or input device 320, or as a separate component. The GPS sensor is configured to receive signals from one or more of a plurality of GPS satellites and to determine the location of the GPS sensor and the mobile device using the signals. More specifically, the GPS sensor determines geolocation information for user system 302. The geolocation information may be calculated, for example, by communicating with satellites using communication interface 325. Where user system 302 is a mobile device or the physical location of a retail establishment, the GPS sensor determines the location of the device/establishment, and may determine boundaries or parameters of a zone accordingly.

For example, the GPS sensor functions as a GPS receiver and receives signals from at least three GPS satellites. The received signals include a time stamp at which the signal was sent and a satellite identifier. The GPS sensor is configured to "reverse engineer" the locations of the GPS satellites and, from the satellites' positions, determine its own location based on how long it took (from the time each signal was sent) to receive each signal. In some cases, the GPS sensor is configured to analyze other data streams to supplement this location-determination process. For example, the GPS sensor may access cellular tower data (e.g., by "pinging" a nearby cell tower) to determine its approximate location and, from that information, only analyze signals from the three nearest GPS satellites. User system 302 may additionally or alternatively include other components such as an accelerometer, gyroscope, and/or any other position and/or location-determining components.

Figure 3:
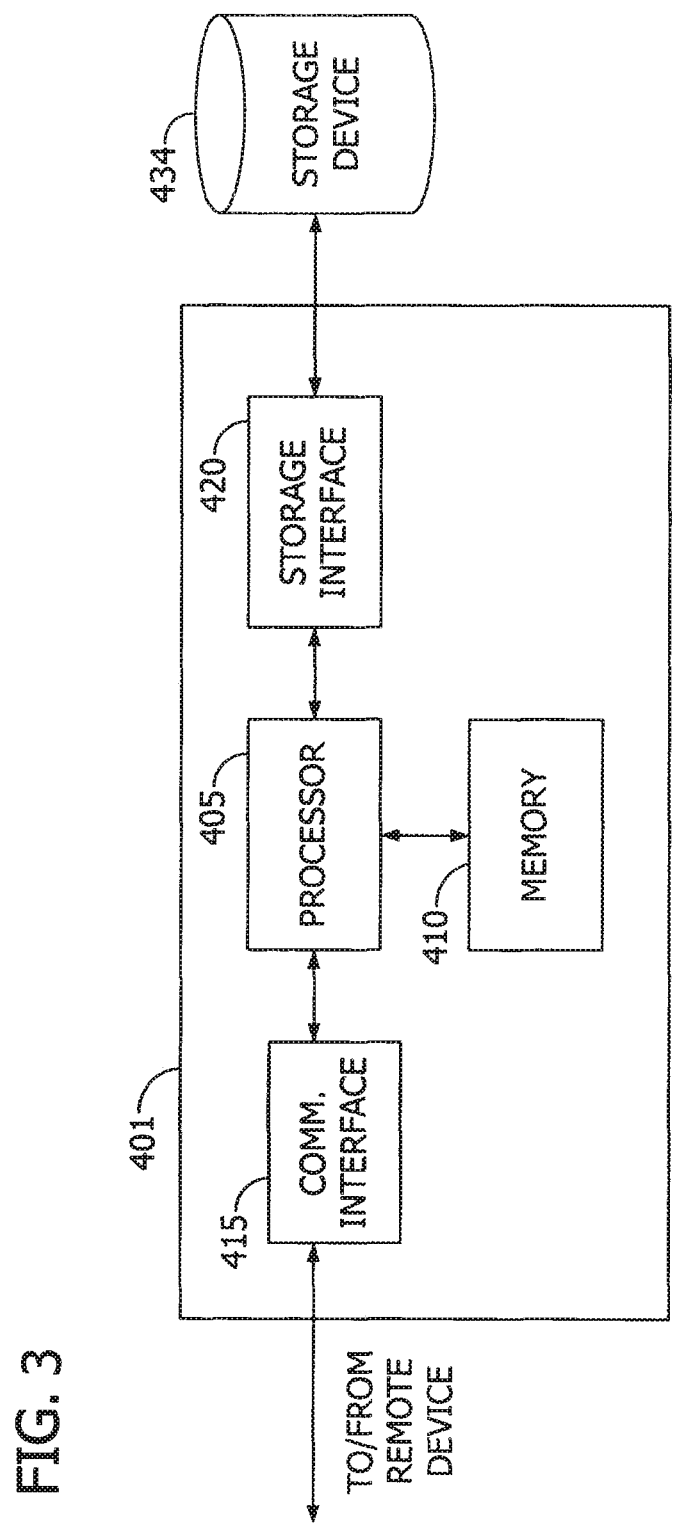

FIG. 3 illustrates an example configuration of a server system 401 such as payment processor 110 (shown in FIG. 1) and geofence computing device 104 (also shown in FIG. 1). Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

In an exemplary embodiment, processor 405 is operatively coupled to a communication interface 415 such that server system 401 is capable of communicating with a remote device such as a user system or another server system 401. For example, server system 401 may be geofence computing device 104, and communication interface 415 may receive data from payment processor 110.

In one embodiment, processor 405 is also operatively coupled to a storage device 434. Storage device 434 is any computer-operated hardware suitable for storing and/or retrieving data. In some embodiments, storage device 434 is integrated in server system 401. For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
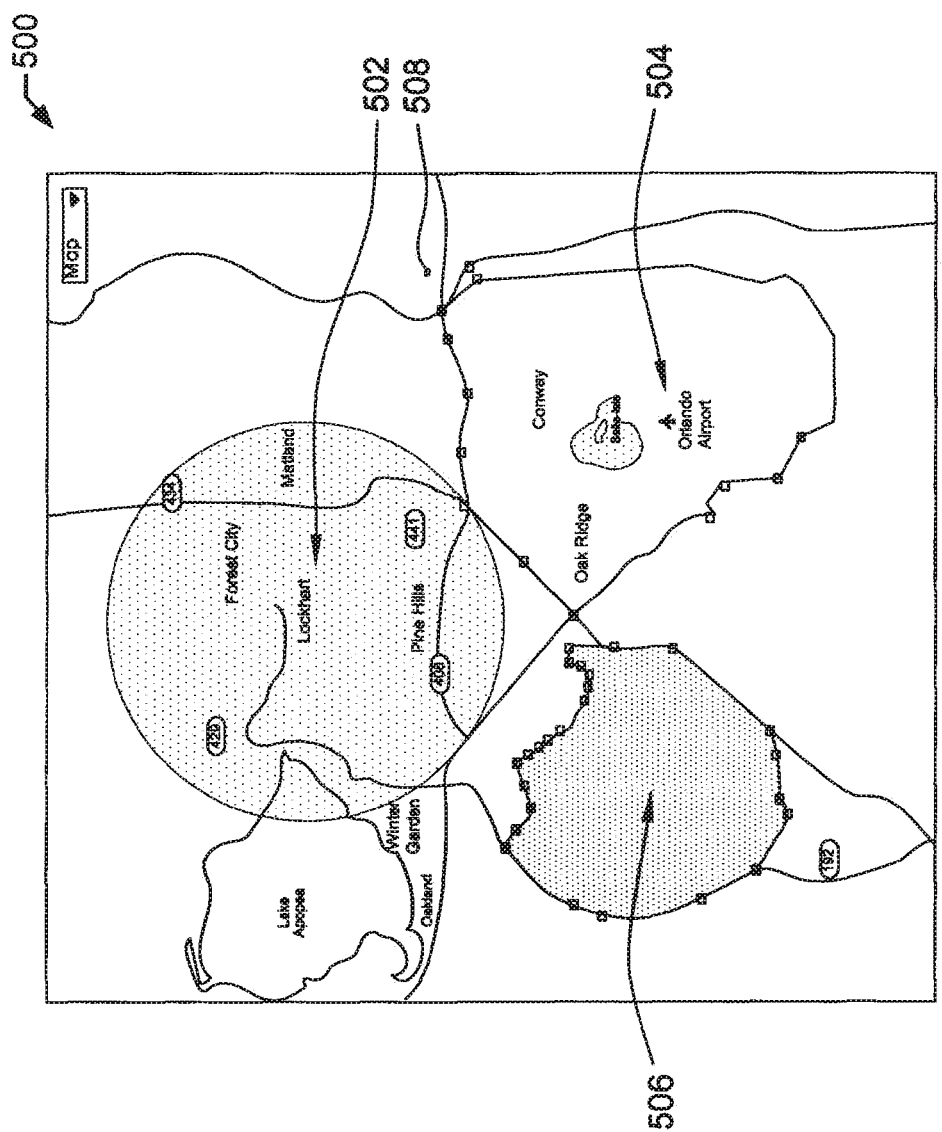

FIG. 4 is an example embodiment of a map 500 of zones generated by a geofence computing device (e.g., geofence computing device 104, FIG. 1) and displayed in a customized website and/or a service application shown on a display device (not separately numbered). Map 500 includes zones 502, 504, 506, and 508 designated by a user (user 111, FIG. 1) using the systems and processes described above. The boundary for zone 502 is, for example, created by the user by designating a desired location, such as an address, coordinates, or a zip code, and applying a zone radius from a center point of the location, as represented by the illustrated circular configuration.

Zone 504 is designated, for example, a target residential zone corresponding to a particular municipality, wherein zone parameters may be specified to monitor for selected merchants within zone 504. Zone 506 is designated, for example, as a competitive zone, wherein where the same zone parameters are specified for monitoring regarding selected merchants within zone 506. In one embodiment, the specified zone parameters in zone 506 are monitored for cardholder transactions performed by residents of zone 504. In some embodiments, boundaries for zones 504 and 506 are created through use of an input device to draw zone perimeters on map 500 displayed in the customized website or the service application. In another embodiment, boundaries for zones 504 and 506 were created by designating a location and applying a zone radius from a center point of the location. In this example, the geofence computing device may be configured to dynamically alter the radiuses of zones 504 and 506 based on cardholder transaction data, thereby creating irregular boundary parameters. Zone 508 is, for example, a mini-zone, such as for a mall, or individual retail location. In some embodiments, zone 508 is located within one of the other zones 502, 504, or 506.

In the example embodiment, a geofence computing device (e.g., geofence computing device 104, FIG. 1) receives transaction data and/or GPS data that denotes the location of the cardholder. The geofence computing device may use map 500 to provide a location of a cardholder in a manner useful to the cardholder. For example, geofence computing device may identify a location of the cardholder on map 500 as a dot or an icon (not shown).

Figure 5:
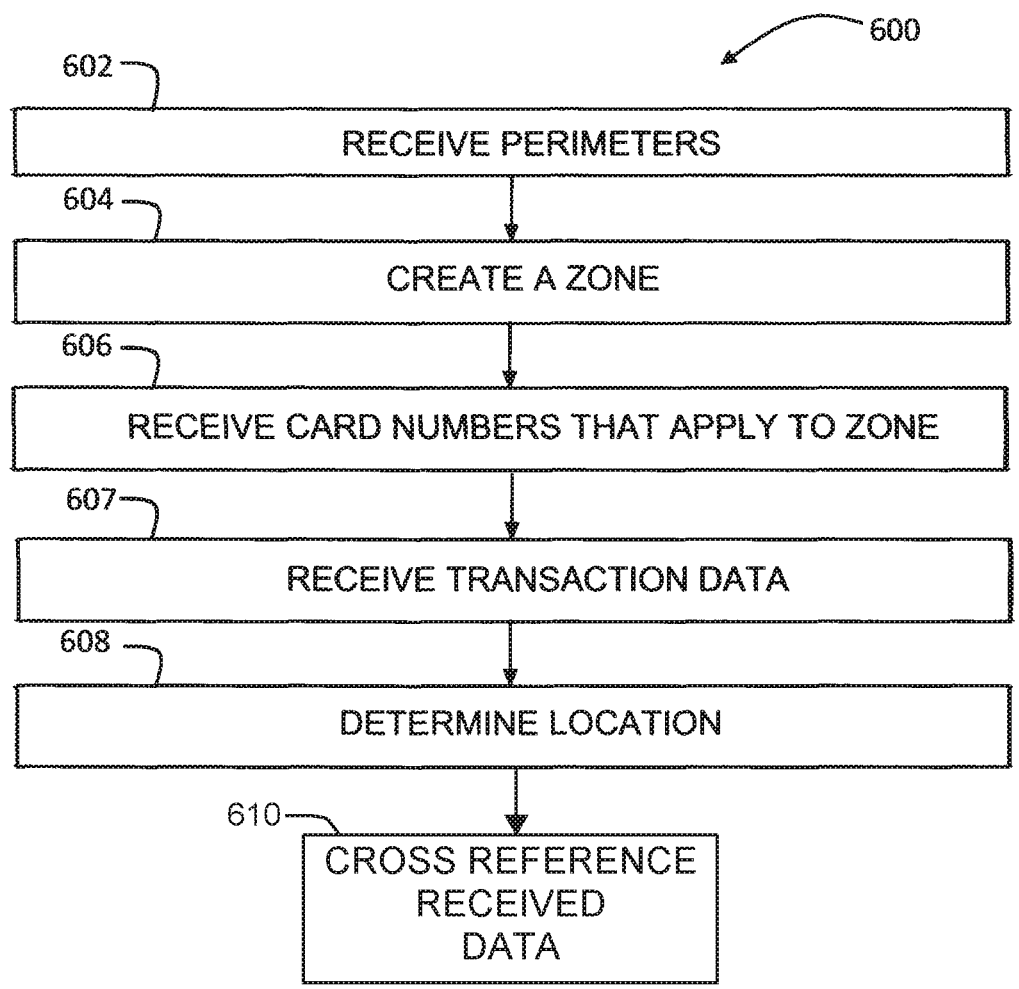

FIG. 5 is an example process 600 for creating and/or monitoring a zone using a geofence computing device. According to process 600, a user (e.g., user 111, FIG. 1) accesses a customized website or a service application in communication with the geofence computing device. In step 602, geofence computing device (e.g. device 104, FIG. 1) receives a location, a zone radius, and/or a zone type (hereafter, referred to as "perimeters"). In step 604, the geofence computing device creates a zone based on the perimeters. In step 606, the geofence computing device receives, from a payment processor (e.g., payment processor 110, FIG. 1) one or more payment card numbers of payment cards that apply to the zone, for example, cardholder residential addresses within a particular zone.

In step 607, geofence computing device receives transaction data of one or more payment transactions conducted between a cardholder and a merchant using one or more of the payment cards/card numbers received in step 606. In some embodiments, the received transaction data includes both the payment card number, and also a location of the merchant. In step 608, the geofence computing device determines one or more of a location of the cardholder using the received payment card/card number and a location of the merchant. The location of the cardholder may be determined based at least in part on (i) the merchant location associated with the transaction data, and/or (ii) wireless data and/or other geolocation data such as electronic device location data, geotemporal data, or geopositioning data. The location of the merchant may be similarly determined. In step 610 the geofence computing device cross references the received transaction data and location data (e.g., by analytics module 118, FIG. 1) with merchant data and/or demographic data within a database (e.g., database 116) in communication with the geofence computing device.

Figure 6:
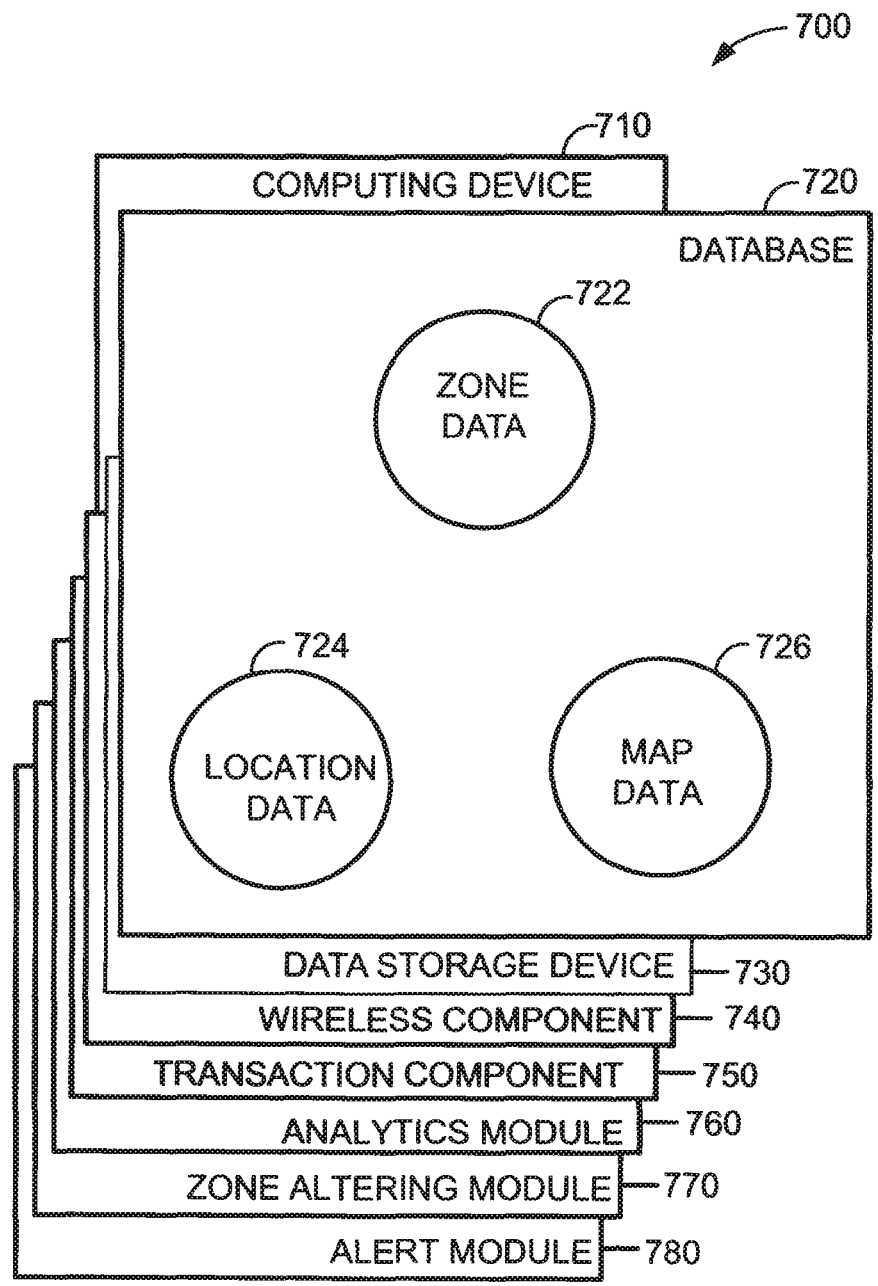

FIG. 6 shows an example configuration 700 of a database 720 within a computing device 710, along with other related computing components, that may be used to create, organize, and monitor zones based at least in part on received data and payment card transactions. In some embodiments, computing device 710 is the same or similar to geofence computing device 104, FIG. 1. Database 720 is coupled to several separate components within computing device 710, which perform specific tasks.

In the example embodiment, database 720 includes zone data 722, location data 724, and map data 726. In some embodiments, database 720 is similar to database 116 (shown in FIG. 2). Zone data 722 includes information associated with geofence zones, including predetermined and dynamic zone parameters. Location data 724 includes information associated with locations of payment card transactions and point-of-sale devices/retail locations. Map data 726 includes data associated with a plurality of maps, for example, map 500 (shown in FIG. 5).

Computing device 710 includes database 720, as well as one or more data storage devices 730, which may store database 720. In one example embodiment, device 710 further includes a wireless component 740 for receiving and analyzing wireless data to determine a cardholder and for merchant location. Computing device 710 further includes a transaction component 750 for correlating the locations of payment card transactions with merchants and cardholders, and for matching account identifiers. An analytics module 760 (which may be the same as or similar to analytics module 118, FIG. 1) is provided for analyzing received transaction data and cross referencing the transaction data with merchant data and/or demographic data. In some embodiments, analytics module 760 is further configured to calculate predictive changes to cross referenced spending trends due to changes in input parameters, as described above. In at least one embodiment, computing device 710 further includes a zone altering module 770 for altering a zone based on received transaction data or user input. Computing device 710 includes an alert module 780 for transmitting an alert to a user or an issuer based on the systems and methods described above.

Figure 7:
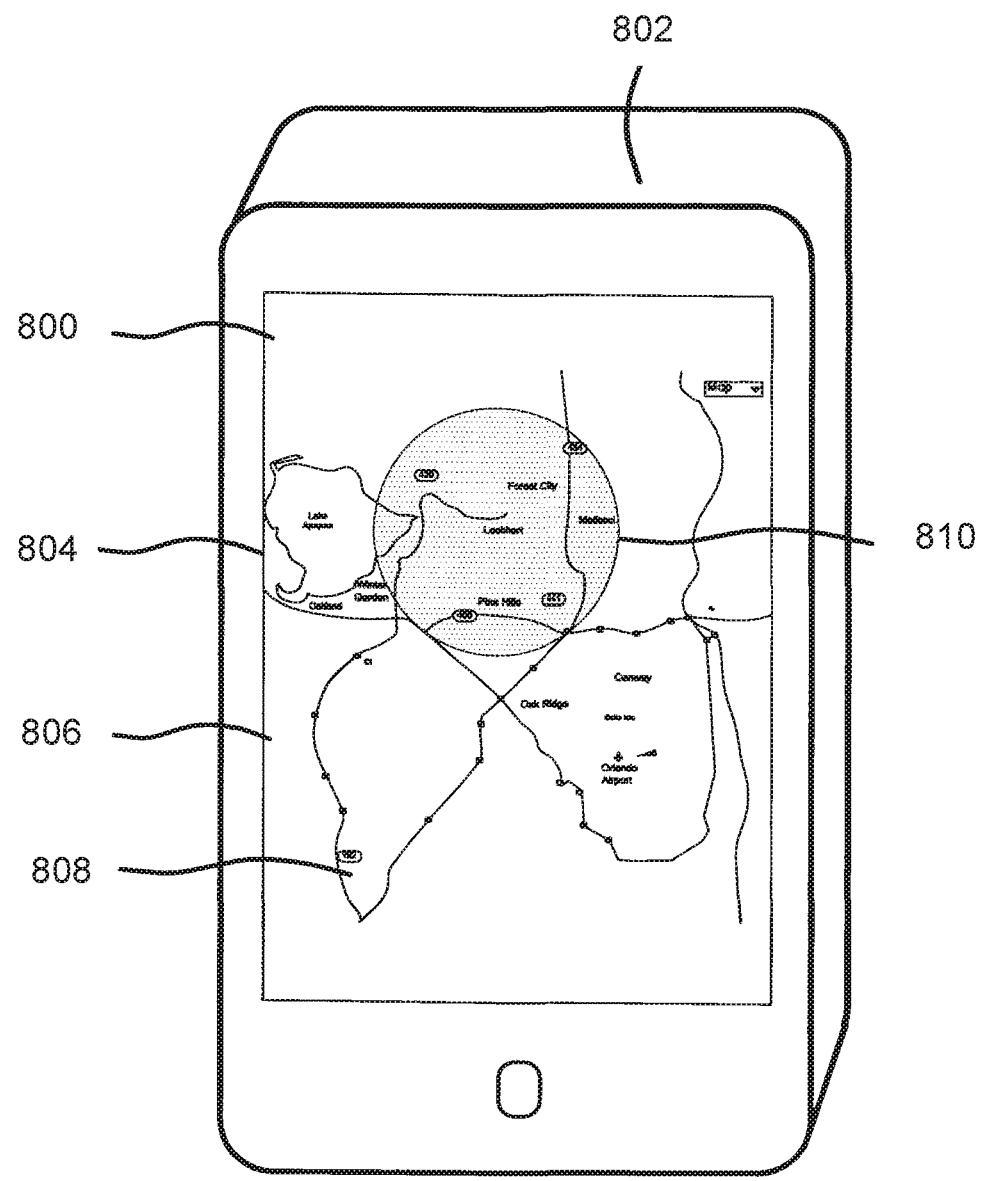

FIG. 7 shows an example graphical user interface (GUI) 800 of a user device 802, such as client systems 106 (shown in FIG. 1) and/or user system 302 (shown in FIG. 2), operated by user 111 (shown in FIG. 1) to create, organize, and monitor zones. In the example embodiment illustrated, user device 802 is a mobile computing device. In alternative embodiments, the device 802 a server, a desktop computer, or another type of electronic computing system capable of performing functions of the systems and methods described herein. As illustrated in FIG. 7, user device 802 may include, without limitation, mobile phones, smartphones, personal digital assistants (PDAs), and/or any device capable of executing stored computer-readable instructions, whether mobile or stationary.

In the example embodiment, user device 802 includes at least one media output component 804 for presenting information to user 111. Media output component 804 is any component capable of conveying information to user 111, such as a display or touch screen. User device 802 further includes an input device 806 for receiving input from user 111. In the example embodiment, input device 806 is a touch sensitive panel, such as a touch screen. In alternate embodiments, input device 806 includes, without limitation, a keyboard, a pointing device, a mouse, a stylus, a gyroscope, an accelerometer, a position detector, and/or an audio input device. In some embodiments, a single component such as a touch screen may function as both an output device of media output component 804 and input device 806. User device 802 may also include a communication interface, such as communication interface 325 (shown in FIG. 2), that is communicatively coupleable to a remote device such as server system 102 (shown in FIG. 1) and/or geofence computing device 104 (shown in FIG. 1). Communication interface 325 may include, for example and without limitation, a wired or wireless network adapter or a wireless data transceiver for use with a mobile phone network, Global System for Mobile communications (GSM), 3G, or other mobile data network or Worldwide Interoperability for Microwave Access (WIMAX).

Stored in a memory area (not shown) within user device 802 are, for example, computer readable instructions for providing GUI 800 to user 111 via media output component 804 and receiving and processing input from GUI 800 via input device 806. GUI 800 may include, among other possibilities, a web browser and/or a service application. In one embodiment, GUI 800 enables user 111 to display and interact with media and other information typically embedded on a customized website (e.g., customized website 108 shown in FIG. 1) or a service application (e.g., software application 107 shown in FIG. 1) from server system 102 and/or geofence computing device 104. In some embodiments, the service application includes a digital wallet.

In the example embodiment, user 111 utilizes GUI 800 to create, organize, and/or monitor zones to analyze cardholder spending trends to make predictive calculations regarding government policy parameters and/or optimal retail establishment locations. More specifically, user 111 uses GUI 800 in association with geofence computing device 104 to create one or more zones for analyzing transaction data from payment card purchases within, or outside of, the one or more zones. GUI 800 may provide one or more input methods for user 111 to input locations. As one example, GUI 800 may provide a text entry field for entry of physical addresses of the locations, such as street addresses, ZIP codes, and/or ZIP+4 codes. GUI 800 may also provide a text entry field for entry of a zone radius. As another example, GUI 800 may provide an interactive map (e.g. map 808) to user 111, such that user 111 may select (e.g., tap, circle, draw, etc.) one or more locations. More specifically, user 111 can specify the boundary of a zone by using input device 806 to draw a perimeter on a map displayed by GUI 800.

In the example illustrated in FIG. 7, a map 808 is displayed on GUI 800 on a touch sensitive panel. In this example, user 111 may use a finger or stylus to specify a zone boundary on map 808, such as circling zone boundary 810. GUI 800 further enables user 111 to enter a zone type for the zone and one or more account identifiers, such as payment account numbers (PANs) of payment cards, which are applicable to the specified zone. In one example embodiment, GUI 800 presents a drop-down menu with a list of zone types from which user 111 may choose for each zone. In this example, geofence computing device 104 applies the user input into GUI 800 as the defined boundary.

In some embodiments, the service application generates zone utilizing user input entered on GUI 800. Each zone defined by user 111 may be stored by the service application in a memory accessible to the service application. The memory may be additionally or alternatively accessible by user device 802. The service application may perform one or more subprocesses using the zone information on behalf of server system 102 and/or geofence computing device 104. For example, where the service location includes a digital wallet for use at a physical merchant, the service application may determine whether a cardholder using a received payment card number is within one or more zones stored in the memory using merchant geographic location information included within transaction data received by the digital wallet. The service application then determines, using the geographic location of the merchant provided in the transaction data, whether the cardholder is inside or outside the one or more zones stored in the memory. In some embodiments, user 111 is able to view a map of one or more created zones, as shown in FIGS. 4 and 7 on GUI 800, which utilizes the zones saved in the memory or receives zone data from geofence computing device 104 to display the one or more zones on the map.

According to the systems and methods described herein, businesses and governments may, where permitted by and in compliance with all relevant privacy and data usage laws, more accurately determine where and how their customers and citizens, respectively, make purchases, and also how far away from the customer's/citizen's residence purchases are made. According to the embodiments described herein, such determinations can be calculated according to the type of goods or services purchased, and the trend of such determined consumer spending may also be predicted for selected changes in parameters by the respective business (e.g., retail location) or government entity (e.g., tax rates, zoning laws, etc.).

Utilizing the systems and methods described herein, a business entity may, for example, more accurately predict how far consumers are willing to travel to purchase costly durable goods, such as appliances, as opposed to more fungible goods, such as gasoline or fast food. The business entity may further predict spending trends based on received cardholder demographic data, which may affect the predictive score of the spending trends for different types of goods and services. A government entity, on the other hand, may more accurately determine which types of businesses may be optimally brought into the community, and which government parameters can be adjusted to make the local government more attractive for a business to open a retail location, or more retail locations. Through implementation of the embodiments disclosed herein, businesses and governments are better able to determine other cardholders are purchasing goods and services outside of the business/government zone, even when the same goods and services are available within the zone. The embodiments herein are equally applicable to monitor purchases made online, where physical zone boundary locations may not be as significant.

In addition to the transaction data, merchant data, and demographic data that are described above to be monitored, analyzed, and cross referenced, the systems and methods herein may further utilize other types of data to perform the described analysis and calculations, including, without limitation, housing and real estate data, weather data, and census data. Utilizing weather data, for example, the systems and methods described herein may advantageously predict changes in cardholder spending trends according to seasonal weather changes across different times of the year. In addition to businesses and governments, the spending trend analyses and predictive calculations described herein may be particularly advantageous to individual customers of particular goods or services. For example, the spending trend analyses and predictive calculations can be configured to send alerts to individual customers considering buying a home as opposed to renting.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or objectoriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A geofence computing device for monitoring and analyzing payment card transactions within geofence zones, the geofence computing device in communication with a user device and a payment processor implementing a payment processing system for a payment card network, the geofence computing device comprising:
   a memory; and
   a processor in communication with the memory, wherein the processor is configured to:
      cause an interactive zone map to be displayed on a display device of the user device via a client application executing on the user computing device;
      receive, from the user device, geofence data including a first zone perimeter and a second zone perimeter input by a user via the interactive zone map;
      create from the received geofence data a first user defined geofence zone having a first geographic area within a first geographic boundary and a second user defined geofence zone having a second geographic area within a second geographic boundary;
      receive, from the user device, a change in a sales tax rate for the first user defined geofence zone and a date of the change in the sales tax rate;
      retrieve, from the payment processor, historical transaction data for payment transactions processed by the payment processing system prior to the date of the change in the sales tax rate, wherein the historical transaction data includes (i) a first set of historical transaction data for transactions made by a plurality of cardholders residing in the first user defined geofence zone with merchants in the first user defined geofence zone, and (ii) a second set of historical transaction data for transactions made by a plurality of cardholders residing in the first user defined geofence zone with merchants in the second user defined geofence zone, wherein the merchants in the first user defined geofence zone and the merchants in the second user defined geofence zone are in communication with the payment processor via the payment network, and wherein the payment transactions are transmitted to the payment processor by the merchants in the first user defined geofence zone and the merchants in the second user defined geofence zone via the payment card network;
      calculate, using an analytics module, a pre-change comparison between the first set of historical transaction data for the plurality of cardholders and the second set of historical transaction data for the plurality of cardholders;
      monitor, in real-time, authorization request messages submitted via by merchants to the payment processor via the payment card network subsequent to the date of change, wherein each authorization request message represents a payment transaction initiated at a respective merchant by a respective cardholder, and wherein each authorization request message includes at least one of a merchant location and a merchant identifier;
      determine a first set of the authorization request messages for a plurality of cardholders for which a geographic location of a residence of each respective cardholder is in the first user defined geofence zone and the merchant location of the respective merchant is in the first user defined geofence zone;
      determine a second set of the authorization request messages for a plurality of cardholders for which a geographic location of the residence of each respective cardholder is in the first user defined geofence zone and the merchant location of the respective merchant is in the second user defined geofence zone;
      calculate, using the analytics module, a post-change comparison between the first set of the authorization request messages and the second set of the authorization request messages;
      compare, using the analytics module, the zone pre-change comparison to the post-change comparison to calculate a spending trend difference between the first user defined geofence zone and the second user defined geofence zone based on the change in the sales tax rate; and
   transmit a report including the spending trend difference in the pre-change comparison and the post-change comparison to the user device.

2. The geofence computing device of claim 1, wherein the processor is further configured to create the first user defined geofence zone by one or more of (i) receiving a central location input by the user via the interactive zone map, (ii) receiving a distance radius input by the user via the interactive zone map, and (iii) creating the first user defined geofence zone based on the central location and the distance radius.

3. The geofence computing device of claim 1, wherein the processor is further configured to create the first user defined geofence zone based on at least one of city, state, county, or municipality information received from the user device via the interactive zone map.

4. The geofence computing device of claim 1, wherein the processor is further configured to analyze the received historical transaction data and the authorization request messages and transmit to the user device a cardholder spending trend summary of payment transactions performed within the first user defined geofence zone.

5. The geofence computing device of claim 4, wherein the cardholder spending trend summary is based upon a selected retail product or service.

6. The geofence computing device of claim 5, wherein the selected retail product or service is one of gasoline, cigarettes, liquor, fast food, appliances, and real estate.

7. The geofence computing device of claim 5, wherein the processor is further configured to calculate a predictive spending trend score based on a change in one or more zone parameters of the first user defined geofence zone.

8. The geofence computing device of claim 7, wherein the zone parameters include one or more of a tax rate, zoning restrictions, and a distance between each respective cardholder residence geographic location and the first geographic boundary.

9. The geofence computing device of claim 4, wherein the cardholder spending trend summary is further based upon one or more of merchant data, demographic data, weather data, census data, and real estate or housing data.

10. The geofence computing device of claim 1, wherein the processor is further configured to monitor a location of a cardholder device of a plurality of cardholders based on received GPS signal, and determine that a cardholder of the plurality of cardholders associated with the respective cardholder device has crossed from the first user defined geofence zone to the second user defined geofence zone.

11. The geofence computing device of claim 1, wherein the processor is further configured to determine that the payment transaction is conducted with an online merchant.

12. The geofence computing device of claim 1, wherein the processor is further configured to dynamically alter the first user defined geofence zone parameters according to specified time periods.

13. The geofence computing device of claim 1, wherein the user device is associated with at least one of a government entity, a business entity, the payment processor, a third party analyst, and a cardholder.

14. A computer-implemented method for creating and analyzing geofence zones, the method implemented using a geofence computing device including a processor in communication with a memory, a user device, and a payment processor implementing a payment processing system for a payment card network, the method comprising the steps of:
    causing an interactive zone map to be displayed on a display device of the user device via a client application executing on the user computing device;
    receiving from the user device geofence data including a first zone perimeter and a second zone perimeter input by a user via the interactive zone map;
    create from the received geofence data a first user defined geofence zone having a first geographic area within a first geographic boundary and a a second user defined geofence zone having a second geographic area within a second geographic boundary;
    receiving, from the user device, a change in a sales tax rate for the first user defined geofence zone and a date of the change in the sales tax rate;
    retrieving, from the payment processor, historical transaction data for payment transactions processed by the payment processing system prior to the date of the change in the sales tax rate, wherein the historical transaction data includes (i) a first set of historical transaction data for transactions made by a plurality of cardholders residing in the first user defined geofence zone with merchants in the first user defined geofence zone, and (ii) a second set of historical transaction data for transactions made by a plurality of cardholders residing in the first user defined geofence zone with merchants in the second user defined geofence zone, wherein the merchants in the first user defined geofence zone and the merchants in the second user defined geofence zone are in communication with the payment processor via the payment network, and wherein the payment transactions are transmitted to the payment processor by the merchants in the first user defined geofence zone and the merchants in the second user defined geofence zone via the payment card network;
    calculating, using an analytics module, a pre-change comparison between the first set of historical transaction data for the plurality of cardholders and the second set of historical transaction data for the plurality of cardholders;
    monitoring, in real-time, authorization request messages submitted by merchants to the payment processor via the payment card network subsequent to the date of change, wherein each authorization request message represents a payment transaction initiated at a respective merchant by a respective cardholder, and wherein each authorization request message includes at least one of a merchant location and a merchant identifier;
    determining a first set of the authorization request messages for a plurality of cardholders for which a geographic location of a residence of each respective cardholder is in the first user defined geofence zone and a merchant location of the respective merchant is in the first user defined geofence zone;
    determining a second set of the authorization request messages for a plurality of cardholders for which a geographic location of the residence of each respective cardholder is in the first user defined geofence zone and the merchant location of the respective merchant is in the second user defined geofence zone;
    calculating, using the analytics module, a post-change comparison between the first set of the authorization request messages and the second set of the authorization request messages;
    comparing, using the analytics module, the zone pre-change comparison to the post-change comparison to calculate a spending trend difference between the first user defined geofence zone and the second user defined geofence zone based on the change in the sales tax rate; and
    transmitting a report including the spending trend difference in the pre-change comparison and the post-change comparison to the user device.

15. The method of claim 14, wherein the transmitted report comprises a spending trend summary of the one or more payment transactions with respect to the first user defined geofence zone.

16. The method of claim 15, further comprising a step of changing a zone parameter of the user defined first geofence zone, and subsequently updating the spending trend summary to include a predictive score reflecting the changed zone parameter.

17. The method of claim 15, wherein the spending trend summary includes an analysis of one or more payment transactions in the first user defined geofence zone in relation to the one or more payment transactions in a second geofence zone, the second geofence zone being different than the first user defined geofence zone.

18. The method of claim 14, wherein creating the first user defined geofence zone comprises one or more of (i) receiving a central location input by the user via the interactive zone map, (ii) receiving a distance radius input by the user via the interactive zone map, and (iii) creating the first user defined geofence zone based on the central location and the distance radius.

19. A non-transitory computer-readable storage medium having computer-executable instructions embodied thereon, wherein when executed by a geofence computing device including a processor in communication with a memory, a user device, and a payment processor implementing a payment processing system for a payment card network, the computer-executable instructions cause the geofence computing device to:

cause an interactive zone map to be displayed on a display device of the user device via a client application executing on the user computing device;

receive, from the user device, geofence data including a first zone perimeter and a second zone perimeter input by a user via the interactive zone map;

create from the received geofence data a first user defined geofence zone having a first geographic area within a first geographic boundary and a second user defined geofence zone having a second geographic area within a second geographic boundary;

receive, from the user device, a change in a sales tax rate for the first user defined geofence zone and a date of the change in the sales tax rate;

retrieve, from the payment processor, historical transaction data for payment transactions processed by the payment processing system prior to the date of the change in the sales tax rate, wherein the historical transaction data includes (i) a first set of historical transaction data for transactions made by a plurality of cardholders residing in the first user defined geofence zone with merchants in the first user defined geofence zone, and (ii) a second set of historical transaction data for transactions made by a plurality of cardholders residing in the first user defined geofence zone with merchants in the second user defined geofence zone, wherein the merchants in the first user defined geofence zone and the merchants in the second user defined geofence zone are in communication with the payment processor via the payment network, and wherein the payment transactions are transmitted to the payment processor by the merchants in the first user defined geofence zone and the merchants in the second user defined geofence zone via the payment card network;

calculate, using an analytics module, a pre-change comparison between the first set of historical transaction data for the plurality of cardholders and the second set of historical transaction data for the plurality of cardholders;

monitor, in real-time, authorization request messages submitted by merchants to the payment processor via the payment card network subsequent to the date of change, wherein each authorization request message represents a payment transaction initiated at a respective merchant by a respective cardholder, and wherein each authorization request message includes at least one of a merchant location and a merchant identifier;

determine a first set of the authorization request messages for a plurality of cardholders for which a geographic location of a residence of each respective cardholder is in the first user defined geofence zone and a merchant location of the respective merchant is in the first user defined geofence zone;

determine a second set of the authorization request messages for a plurality of cardholders for which a geographic location of the residence of each respective cardholder is in the first user defined geofence zone and the merchant location of the respective merchant is in the second user defined geofence zone;

calculate, using the analytics module, a post-change comparison between the first set of the authorization request messages and the second set of the authorization request messages;

compare, using the analytics module, the zone pre-change comparison to the post-change comparison to calculate a spending trend difference between the first user defined geofence zone and the second user defined geofence zone based on the change in the sales tax rate; and transmit a report including the spending trend difference in the pre-change comparison and the post-change comparison to the user device.

* * * * *